(12) United States Patent
Lee et al.

(10) Patent No.: US 6,839,807 B2
(45) Date of Patent: Jan. 4, 2005

(54) MULTI-WAY SET ASSOCIATIVE CACHE MEMORY

(75) Inventors: Sun-Min Lee, Sungnam-shi (KR);
Jong-Taek Kwak, Suwon (KR);
Jin-Sung Kim, Yongin-shi (KR);
Jin-Ho Kwack, Suwon (KR)

(73) Assignee: Samsung Electronics Co., Ltd. (KR)

( * ) Notice: Subject to any disclaimer, the term of this patent is extended or adjusted under 35 U.S.C. 154(b) by 152 days.

(21) Appl. No.: 10/206,588

(22) Filed: Jul. 25, 2002

(65) Prior Publication Data

US 2003/0061446 A1 Mar. 27, 2003

(30) Foreign Application Priority Data

Jul. 27, 2001 (KR) ........................................ 2001-45399

(51) Int. Cl.$^7$ ............................................. G06F 12/00
(52) U.S. Cl. ........................ 711/128; 711/117; 711/118; 365/49; 365/154; 365/205; 365/230.01; 365/230.03; 327/50; 327/51; 327/57
(58) Field of Search ...................... 711/117–118, 128, 711/154, 3; 365/49, 154, 205, 230.01, 230.03, 189.02; 327/50, 51, 57

(56) References Cited

U.S. PATENT DOCUMENTS

| | | | | |
|---|---|---|---|---|
| 5,031,141 A | * | 7/1991 | Guddat et al. ................ 365/49 |
| 5,091,851 A | | 2/1992 | Shelton et al. .............. 395/425 |
| 5,218,687 A | * | 6/1993 | Ducousso et al. .......... 711/128 |
| 5,500,814 A | * | 3/1996 | Kinoshita et al. ............. 365/49 |
| 5,550,774 A | * | 8/1996 | Brauer et al. .......... 365/189.02 |
| 5,586,279 A | * | 12/1996 | Pardo et al. ................... 711/3 |
| 5,848,428 A | | 12/1998 | Collins ...................... 711/127 |
| 5,995,420 A | * | 11/1999 | Hesley .................. 365/189.07 |
| 6,021,461 A | | 2/2000 | Dhong et al. ............... 711/105 |
| 6,057,709 A | * | 5/2000 | Hesley ........................ 326/54 |
| 6,076,140 A | | 6/2000 | Dhong et al. ............... 711/105 |
| 6,525,985 B2 | * | 2/2003 | Mizuno et al. ......... 365/230.03 |
| 2002/0087779 A1 | | 7/2002 | Zhang ........................... 711/3 |

\* cited by examiner

*Primary Examiner*—Matthew Kim
*Assistant Examiner*—Zhuo H. Li
(74) *Attorney, Agent, or Firm*—Mills & Onello, LLP

(57) ABSTRACT

A multi-way set associative cache memory includes a set selection signal operating a sense amplifier. In reading data stored in a set, a set selection signal enables the sense amplifier to select one of sets while plural sets are active by a row address. The simplified structure of the present cache memory reduces power consumption by the rate of 1/N (N is the number of sets).

9 Claims, 12 Drawing Sheets

MULTI-WAY SET ASSOCIATIVE CACHE MEMORY

This application claims priority from Korean Patent Application No. 2001-45399, filed on Jul. 27, 2001, the contents of which are herein incorporated by reference in their entirety.

FIELD OF THE INVENTION

The present invention generally relates to cache memories and, more specifically, to multi-way set associative cache memories with sense amplifiers which can be controlled by set selection signals.

BACKGROUND OF THE INVENTION

In most computer systems including central processing units (CPU) and main memories, the speed for decoding and executing instructions or operands is dependent on how fast the instructions or operands are transferred to the CPU from the main memory.

To shorten the transmission time, a cache memory 106 is interposed between a CPU 102 and a main memory 104 as shown in FIG. 1. The cache memory 106 is relatively small in size and acts as a buffer memory to temporally store data of the memory 104, which reduces access time for fetching data or operands from/to the CPU or the main memory. The cache memory is generally composed of a plurality of blocks (or lines) each of which is associated with an address tag to designate there is a duplicate of data of the memory when the CPU requests the data (or refers the main memory for the data). After comparison of the address tags, a requested block absent in the cache memory is detected from the main memory and, being stored in the cache memory, then provided to the CPU.

U.S. Pat. No. 5,091,851 describes a cache memory system of a multi-way set associative cache type. The multi-way set associative cache memory allows the date processing speed to be accelerated by providing simultaneous accesses to plural data random-access memories (RAMs) with an index. In the cache memory, a set is defined as an assemblage of all lines accessible by one cache index and the number of data RAMs accessible by one cache index represents the number of ways. For instance, one with two data RAMs accessed by one index is referred to as two-way set associative cache memory. If a comparison result with the address tag notes that a requested data block belongs to a specific data RAM, a reading or writing operation is carried out for the specific data RAM.

Referring to FIG. 2, a traditional cache memory 106 includes tag RAMs, 202 and 204, data RAMs 206 and 208, tag comparators 210 and 212, gates 214 and 216, a multiplexer 218, and an OR gate 220.

When requesting data from the cache 106, the CPU 102 offers an address for reading on a line 222. A typical address format is shown in FIG. 3. An address 300 with 32 bits is composed of the field of an address tag 302 of bits 0~20, a cache index 304 of bits 21~25, a line offset 306 of bits 26~29, and a byte offset 308 of bits 30~31.

Data stored in the data RAMs 206 and 208 are associated with 16 lines of word, each RAM retaining 32 lines. Each data line in the data RAM is addressable by the cache index 304. The tag RAM 202 stores an address tag for each data line of the data RAM 206, and the tag RAM 204 stores an address tag for each data line of the data RAM 208. The same cache index simultaneously designates address tags in the tag RAMs 204 and 206 to select relevant data lines therein.

The cache index in the read address 300 is used in accessing an address tag on a current data line in the data RAM 206 at a specific position of the tag RAM 202. The tag RAM 202 loads an address tag on a line 224. Tag comparator 210 compares an address tag of the rag RAM 202 with an address tag of the read address 300. If the two address tags are identical, the tag comparator 210 generates a valid signal to a line 226 to transfer it to the OR gate 220 and the gate 214. However, as a control signal on an input line 228 disables the gate 214, the valid signal on the line 226 cannot be transferred to a write-enable input line 230 for the data RAM 206.

At the same time with the access to an address tag of the tag RAM 202, the cache index 304 and the line offset 306 of the read address 300 are used to access to a data word in the data RAM 206. The data word of the data RAM 206 is loaded on an output line 230. The valid signal on the line 226 makes the multiplexer 218 connect the data of the output line 230 to a line 232. And then, the data on the line 232 is transferred to the CPU 102. If the address tag of the tag RAM 202 is not in accord with the address tag of the read address 300, an invalid signal is loaded on the line 226 from the tag comparator 210, informing the tag RAM 202 of a miss state.

While being utilized in the tag RAM 202 and the data RAM 206, the cache index in the read address 300 is used in accessing an address tag on a current data line in the data RAM 208 at a specific position of the tag RAM 204. The tag RAM 204 loads an address tag on a line 234. Tag comparator 212 compares an address tag of the rag RAM 204 with an address tag of the read address 300. If the two address tags are identical, the tag comparator 212 generates a valid signal to a line 236 to transfer it to the OR gate 220 and the gate 216. However, as a control signal on an input line 238 disables the gate 216, the valid signal on the line 236 cannot be transferred to a write-enable input line 240 for the data RAM 208.

At the same time with the access to an address tag of the tag RAM 204, the cache index 304 and the line offset 306 of the read address 300 are used to access a data word in the data RAM 208. The data word of the data RAM 2085 is loaded on an output line 242. The valid signal on the line 236 makes the multiplexer 218 connect the data of the output line 242 to a line 232. Then, the data on the line 232 is transferred to the CPU 102. If the address tag of the tag RAM 204 is not in accord with the address tag of the read address 300, an invalid signal is loaded on the line 236 from the tag comparator 212, informing the tag RAM 204 of a miss state.

When the tag comparators 210 and 212 generate the invalid signals, a signal informing of a cache miss state appears at an output line 244 of the OR gate 220. Then, a data line of the main memory 104, containing a word designated by the address, is selectively connected to the data RAM 206 or the data RAM 208 from the main memory. An address tag for the selected data line is applied to the tag RAM 202 or the tag RAM 204.

In the operating features of the conventional multi-way set associative cache, the signal obtained from the result in the tag comparator 210 or 212, referred to as a "set selection signal", controls the multiplexer 218. All the data from the multiple sets are read from the data RAMs and selected by the multiplexer 218.

Referring to FIG. 4, which illustrates a typical functional feature like the conventional multi-way set associative cache system with such a multiplexer, as shown in FIG. 2, a tag comparator 608 generates a set selection signal that is applied to a multiplexer 610 (corresponding to 218 in FIG. 2) to select one of data from L2 cache RAMs 606 (i.e., the data RAMs 206 and 208) after comparing an address tag of tag RAMs 604 (i.e., the tag RAMS 202 and 204) with an address tag of a read address provided from an MPU 602 (i.e., the CPU 102). The selected data from the multiplexer 610 is transferred to an output buffer 612.

However, power consumption increases when a read operation is performed in multiple sets to obtain data in a given cycle time. Moreover, power consumption may further increase due to a high number of data lines from the data RAMs to the multiplexer and a number of data bits to be accessed therein.

Also, considering that a read path, through which the set selection signal from the tag comparator is applied to the data RAM to read data stored in the cache, is involved in capacitive loads with lines and circuit blocks, the overall operation speed in the cache system is very dependent on how fast the set selection signal arrives at the cache from the tag RAM. But, although a conventional set selection buffer uses a clock signal to operate the data access with synchronized timing, there is a limit of data transmission because it takes a time until the clock signal is active even while the set selection signal has been enabled.

SUMMARY OF THE INVENTION

It is, therefore, an object of the present invention to provide a cache memory capable of enhancing operation speed while employing multiple data sets.

It is another object of the present invention to provide a cache memory capable of reducing power consumption while employing multiple data sets.

It is further another object of the present invention to provide a cache memory capable of performing an efficient operation of data access with fewer data lines.

According to an aspect of the present invention, there is provided a method of reading data stored in a set in a multi-way set associative cache memory. In accordance with the method, a set selection signal is generated by comparing a stored address with an address of the data. The data is read from a set selected by the set selection signal through a sense amplifier while all row addresses are enabled.

According to another aspect of the present invention, there is provided a multi-way set associative cache memory comprising a tag memory for storing a tag; a data memory for storing data corresponding to the tag; a tag comparator for generating a set selection signal by comparing the tag with an address for the data; and a plurality of sense amplifiers for reading the data of the data memory, one of the sense amplifier being active in response to the set selection signal.

In one embodiment, the memory also includes a circuit for transferring the set selection signal to the sense amplifier for reading the data.

In one embodiment, the set selection signal is driven through a transmission gate controlled by a read-enable signal, being converted to an enable signal in the circuit. The enable signal activates the sense amplifier. The circuit is comprised of: a first tri-state buffer for receiving the set selection signal in response to a first clock signal; a first flip-flop for receiving an output of the first tri-state buffer; a second tri-state buffer for receiving an output of the first tri-state buffer in response to a second clock signal; a second flip-flop for receiving an output of the second tri-state buffer; a first transmission gate for transferring an output of the second flip-flop in response to a state of a read-enable signal; and a second transmission gate for transferring the set selection signal in response to the other state of the read-enable signal.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT

Figure 5:
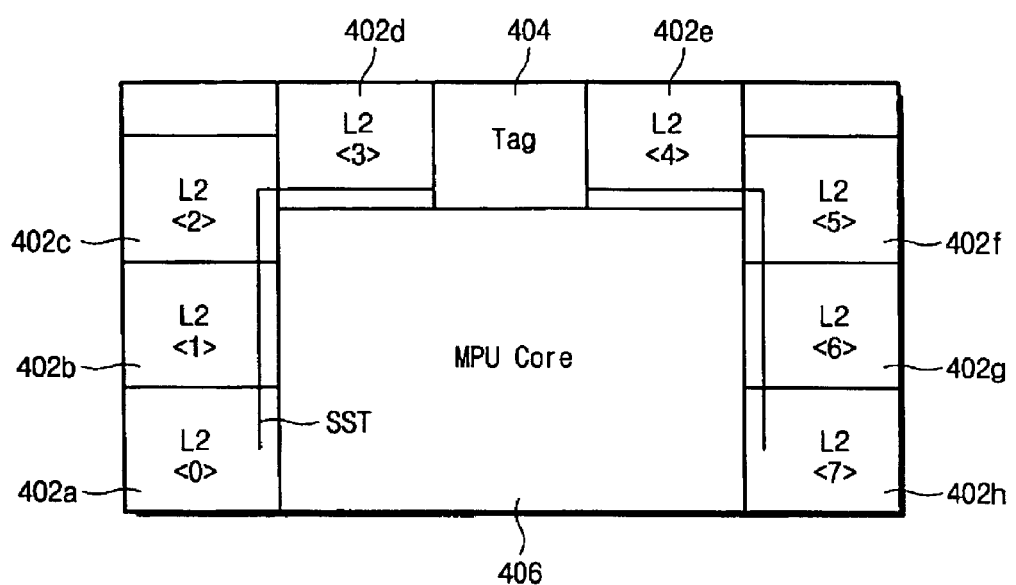
FIG. 5 is a diagram illustrating an internal structure of a microprocessor embedding L2 caches and tags, according to an embodiment of the invention.

Referring to FIG. 5, a microprocessor unit (MPU) embeds, for example, eight L2 caches (i.e., SRAMs) 402a–402h, a tag RAM block 404, and a core block 406. Such an in-house construction with the L2 caches reduces a rate of capacitive loading on lines and enhances operation speed. Addresses and data interface between the core block 406 and the tag RAM block 404 that transfers a set selection signal to the L2 caches 402. In reading data, first a read address provided from the core block 406 is compared with an address that has been stored in the tag RAM block 404, and the comparison result is applied to each L2 cache as a set selection signal SST. The read address designates corresponding wordlines arranged in all the sets of the L2 caches, so that data of the L2 cache is read out in correspondence with the set selection signal SST supplied from the tag RAM block 404.

Figure 6:
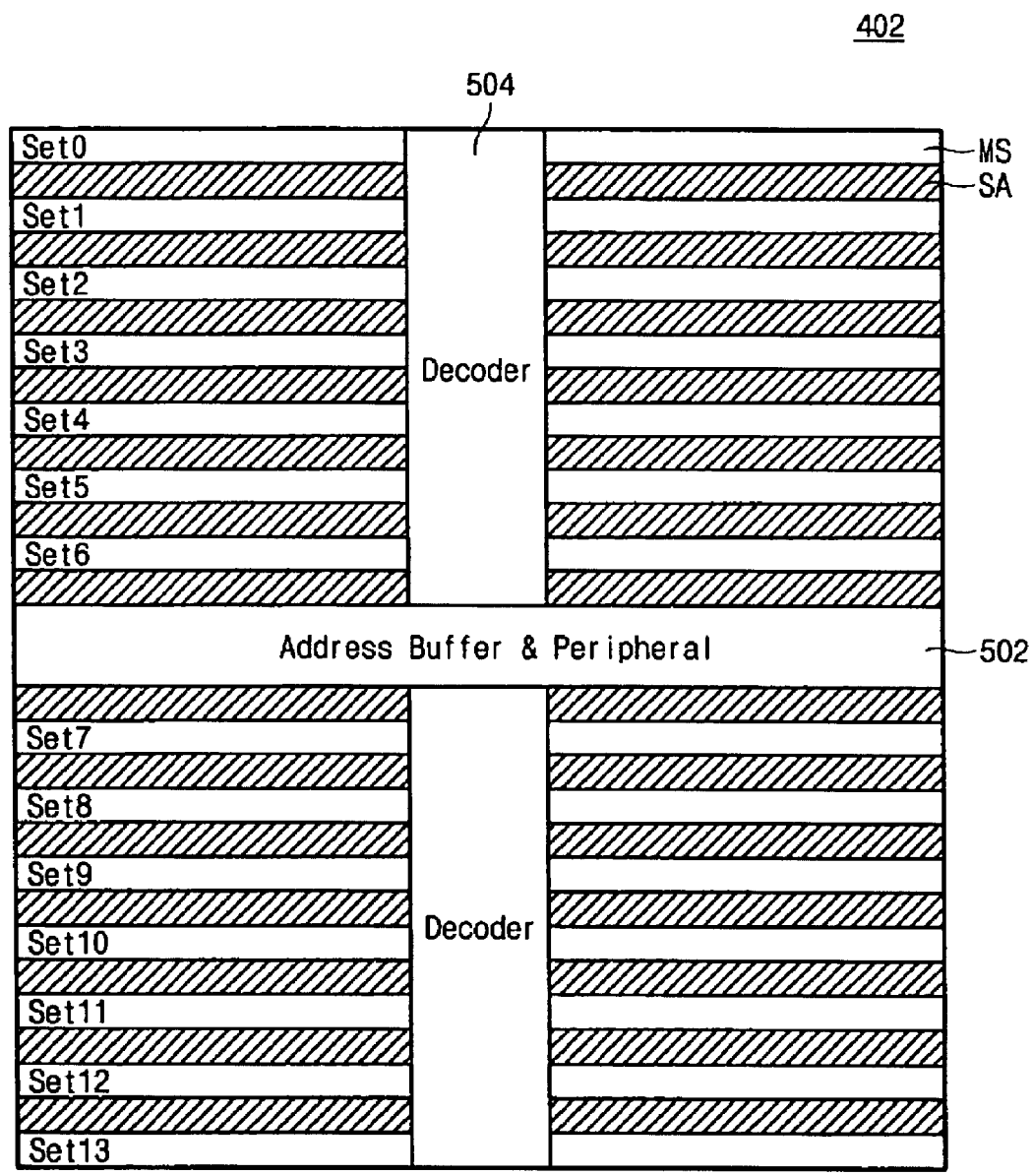
FIG. 6 is a diagram of a SRAM block, as the L2 cache of FIG. 5, composed of multiple sets.

Referring to FIG. 6, each L2 cache 402 shown in FIG. 5 is composed of peripheral circuitry 502 including address buffers and circuits for generating control signals, address decoders 504, memory array sets MS, and sense amplifier blocks SA. Reading a data bit from the L2 cache (i.e., SRAM) is carried out by the sense amplifier after selection of a wordline by the decoders 504 in response to an address.

Figure 4:
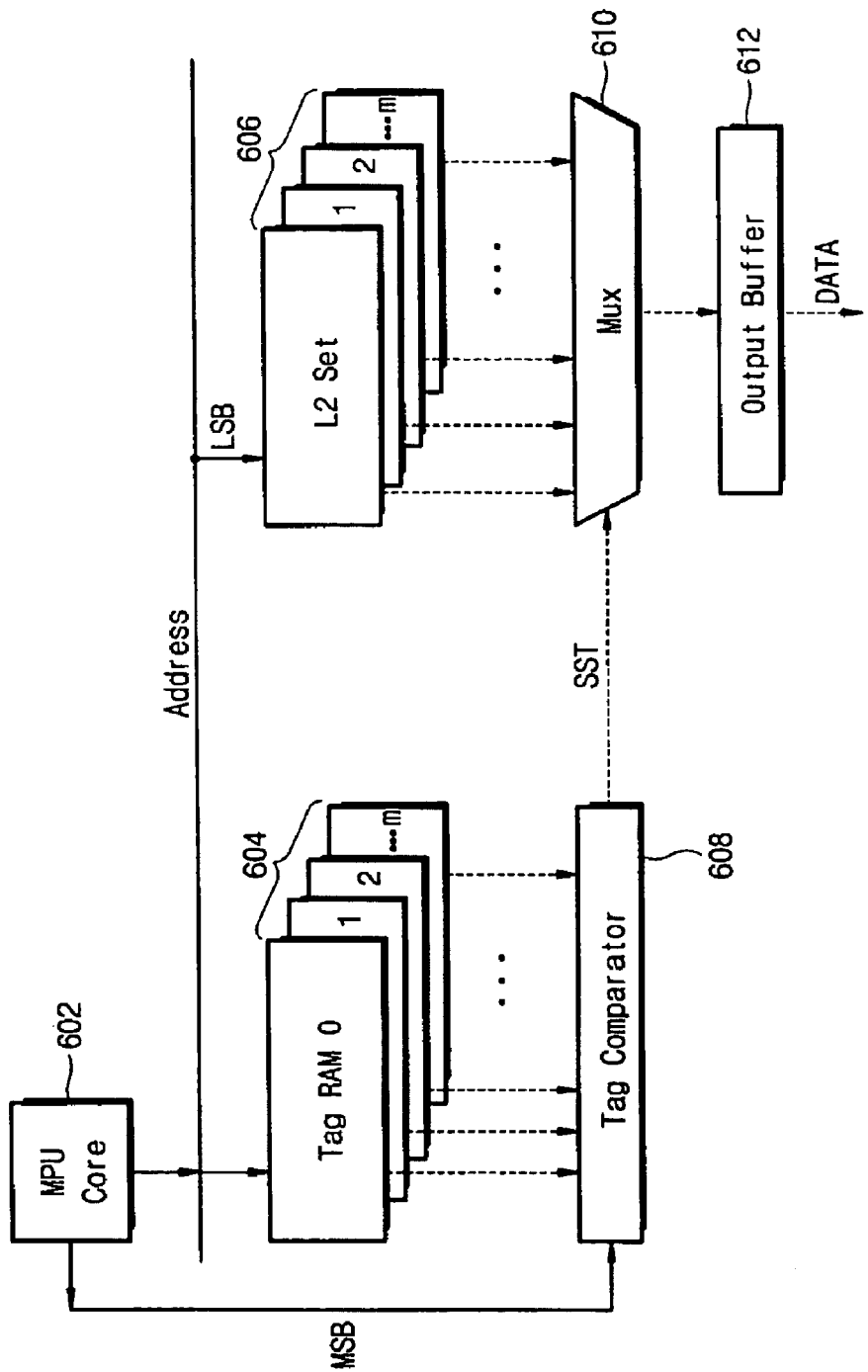
FIG. 4 is a block diagram illustrating a conventional method for selecting sets.
Figure 7:
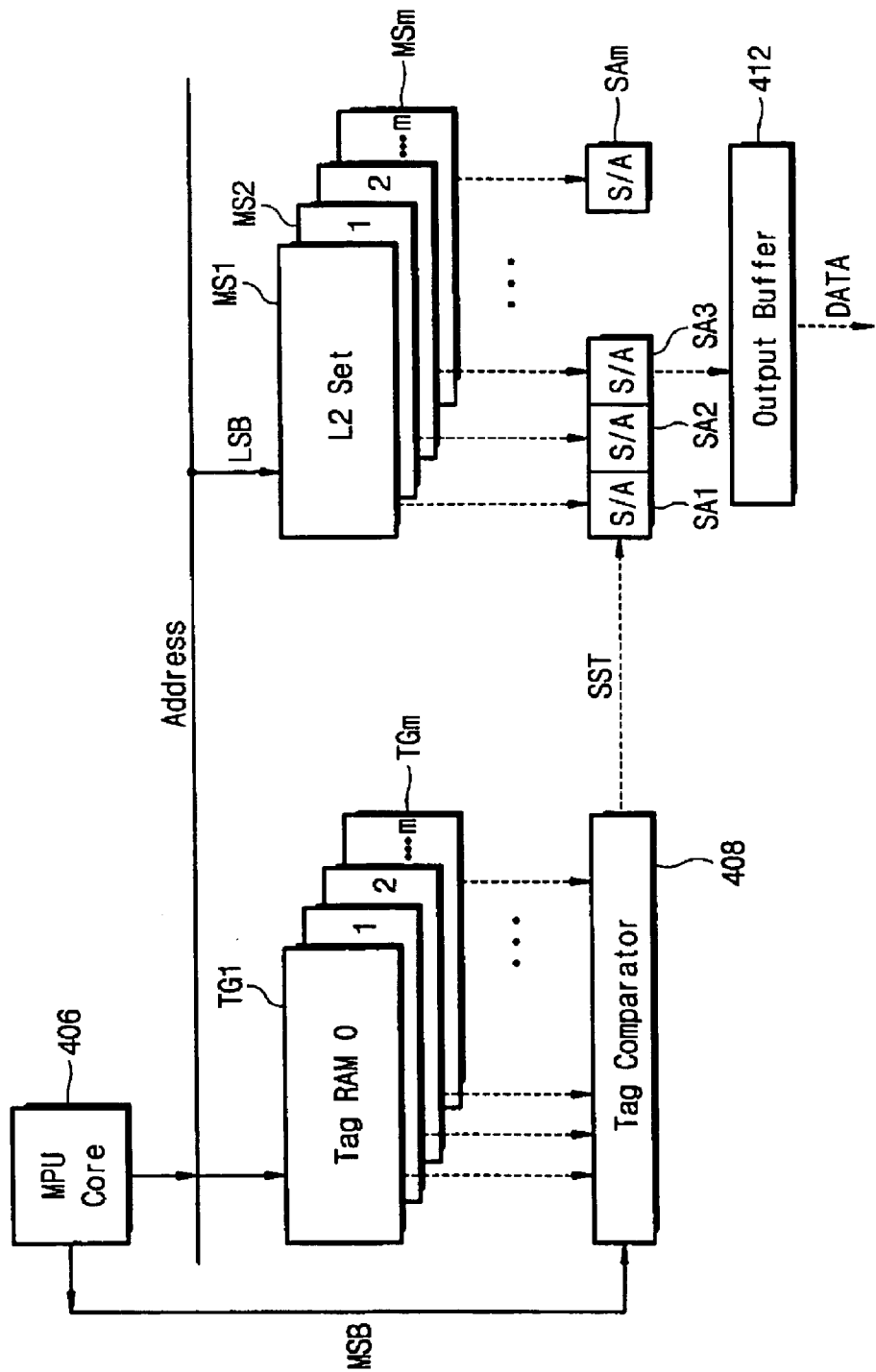
FIG. 7 is a block diagram illustrating a method for selecting sets according to the invention.

FIG. 7 shows an operational feature for cache access in the microprocessor unit shown in FIG. 5, which may be distinguished from that of FIG. 4. The set selection signal SST controls the sense amplifiers SA1~SAm, one of which is alternatively operable by the set selection signal SST. As shown in FIG. 6, the sense amplifiers SA are respectively assigned to the memory array sets MS. Therefore, a data bit from one of the memory array sets MS1~MSm is transferred to a data output buffer 412 through one of the sense amplifiers SA1~SAm. Such an alternative activation with the sense amplifier by means of the set selection signal reduces power consumption rate and complexity of data line layout.

Figure 8:
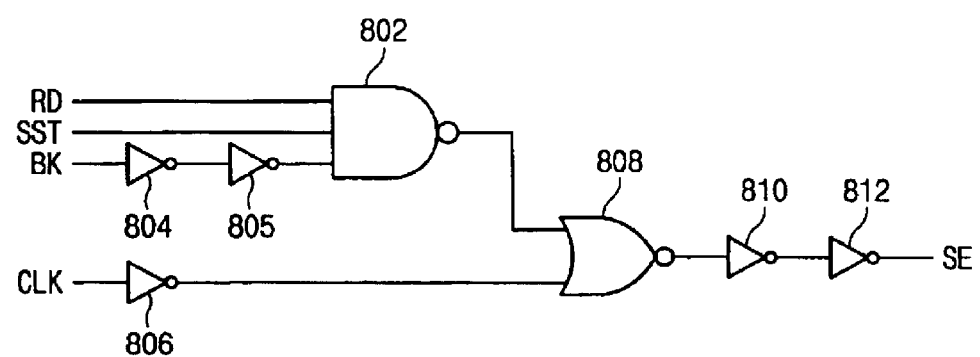
FIG. 8 is a circuit diagram of a local wordline decoder according to the invention.

A signal to activate the sense amplifier in response to the set selection signal SST, a sense-amp enable signal SE, is generated from the circuit shown in FIG. 8. In FIG. 8, a NAND gate 802 receives a read-enable signal RD, the set selection signal SST, and a bank selection signal BK through inverters 804 and 805 serially connected. An output of the NAND gate 802 is applied to a NOR gate 808 that also receives a clock signal clK through an inverter 806. An output of the NOR gate 808 is generated as the sense-amp enable signal SE through inverters 810 and 812 serially connected.

Figure 9:
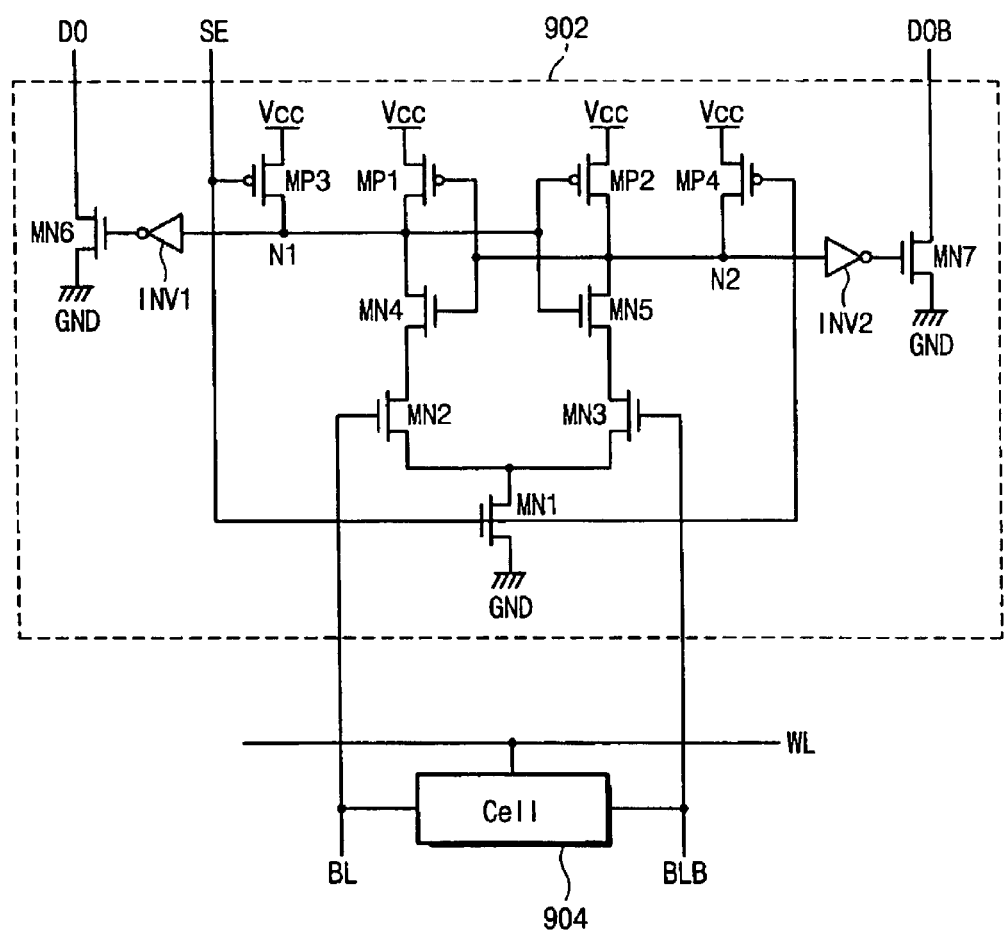
FIG. 9 is a circuit diagram of a sense amplifier according to the invention.

Referring to FIG. 9, the sense amplifier SA includes a differential amplifier coupled between a memory cell 904 and data lines DO and DOB. The sense-amp enable signal SE is applied to gates of an NMOS transistor MN1 and PMOS transistors MP3 and MP4. MN1 connects the differential amplifier, which is formed of PMOS transistors MP1 and MP2 and NMOS transistors MN2~MN5, to a ground voltage (or a substrate voltage) GND. MP3 is connected between a power supply voltage VCC and a node N1 that is connected to gates of MP2 and MN5. The node N1 is also connected to a gate of an NMOS transistor MN6, which is connected between the data line DO and GND, through an inverter INV1, and to a common drain node of MP1 and MN4. MP4 is connected between VCC and a node N2 that is connected to gates of MP1 and MN4. The node N2 is also connected to a gates of an NMOS transistor MN7, which is connected between the data line DOB (complementary to DO) and GND, through an inverter INV2, and to a common drain node of MP2 and MN5.

When the sense-amp enable signal SE is at a low level, the nodes N1 and N2 are charged up to VCC and thereby MN6 and MN7 become non-conductive. Thus, there is no data on the data lines DO and DOB. That is a disable state of the sense amplifier. When the sense-amp enable signal SE becomes active with a high level, the NMOS transistors MN2 and MN3 become sensible to a state of the memory cell 904 that varies voltage levels of the bitlines BL and BLB in response to an activation of the wordline WL. Assuming that BL is charged higher than BLB in response to a charge state stored in the memory cell, MN2 is more conductive than MN3, resulting in an earlier falling-down of a voltage level at the node N1 than at the node N2. As MP1 transitions to a turn-off state while MP2 transitions to a turn-on state, in accordance with the voltage states of the nodes N1 and N2, the data lines DO and DOB are established to low and high levels, respectively, which reads the storage state of the memory cell.

Figure 1:
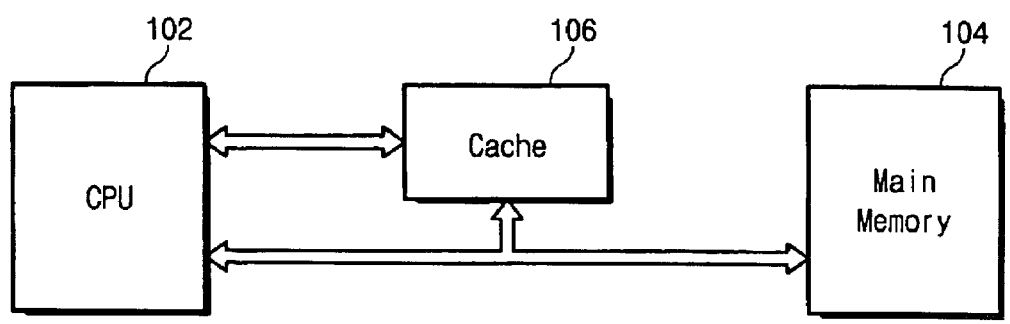
FIG. 1 is a block diagram of a general computer system including a data processor, a main memory, and a cache memory.
Figure 2:
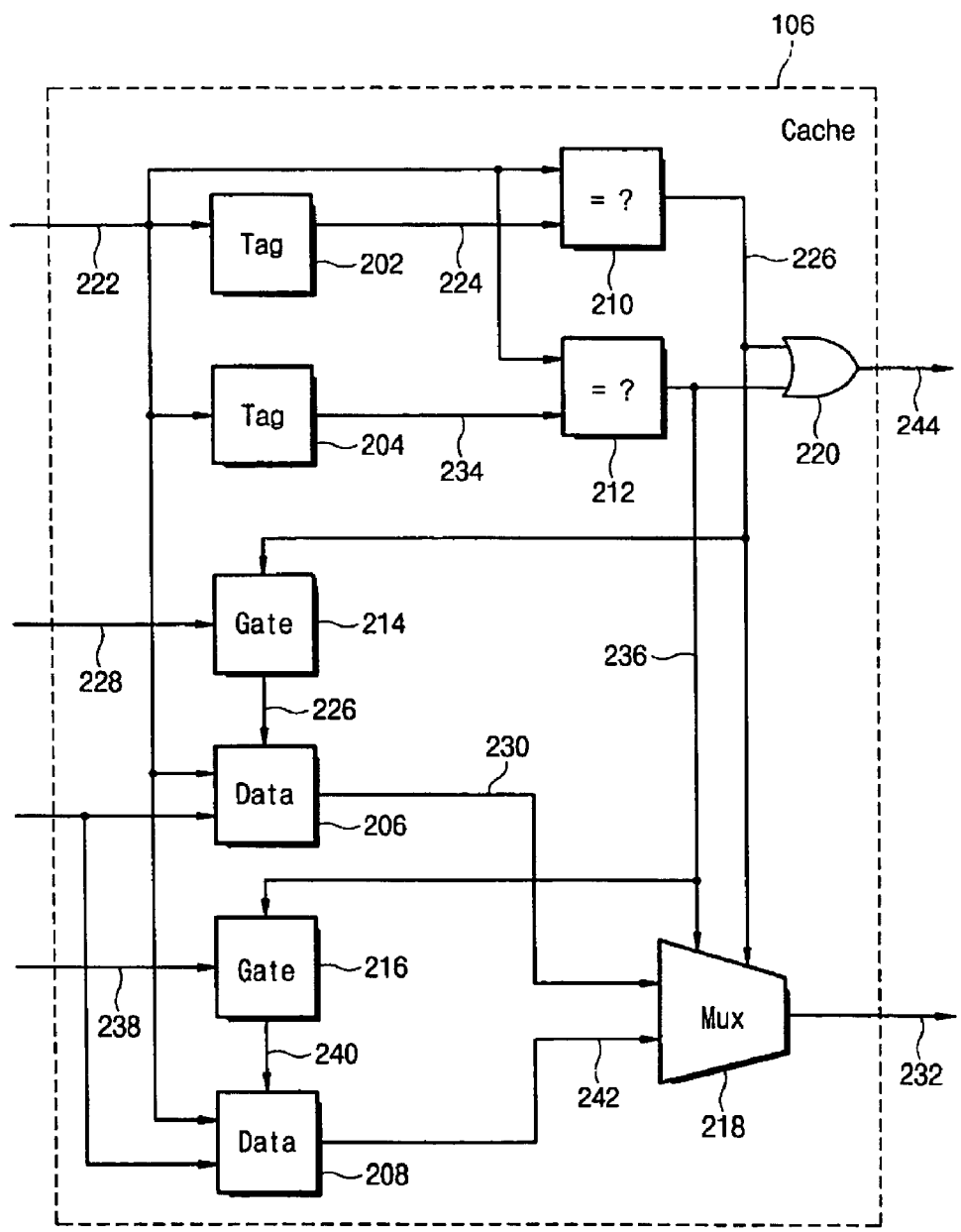
FIG. 2 is a block diagram of a traditional cache memory.
Figure 3:
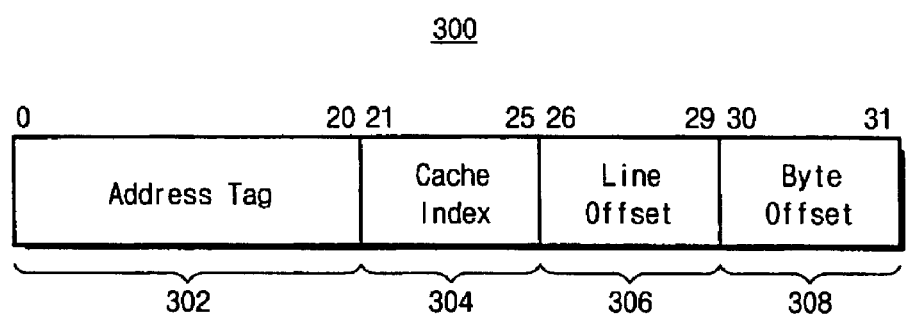
FIG. 3 is a diagram illustrating a structure of a read address.
Figure 10:
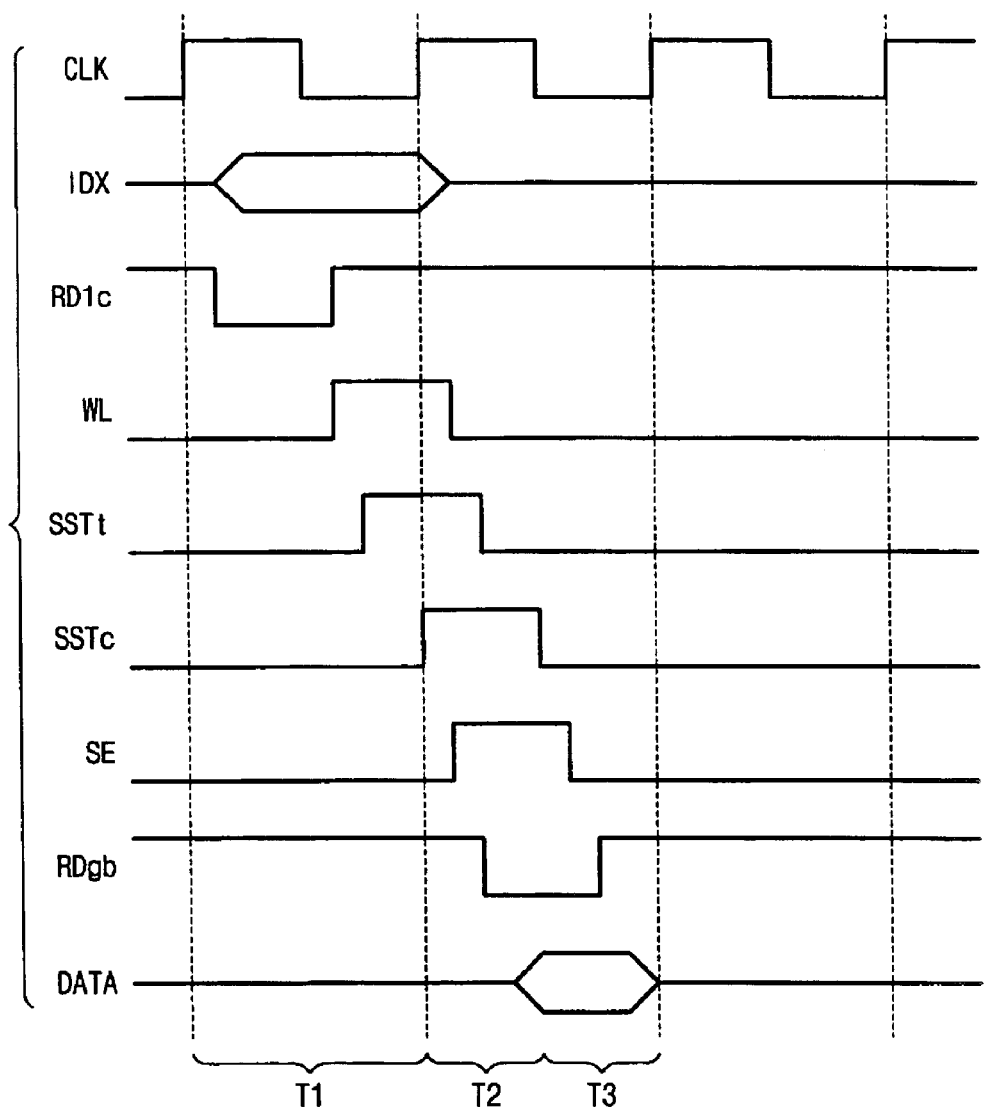
FIG. 10 is a timing diagram of signals operable in the set selection procedure according to the invention.

FIG. 10 shows an overall operation timing, with the set selection signal SST and the wordline WL, for outputting data from the sense amplifier in the L2 cache. A read bitline enable signal RD1c is applied to the tag RAM 404 and the L2 cache 402 simultaneously. During a time period T1, the set selection signal SE is generated from the tag comparator 408 that compares an address tag of the CPU 406 with an address tag (302 of FIG. 3) of the tag RAM 404, and then is applied to the sense amplifier 508. At the same time, the wordline WL of the L2 cache is activated in response to the cache index IDX (304 of FIG. 3). SSTt is a set selection signal provided from the tag comparator 408, and SSTc denotes the set selection signal arriving at the L2 cache 402, respectively. As the set selection signals SSTt and SSTc are enabled during a time period T2 with a time interval between them, a sense amplifier (one of SA1~SAm in FIG. 7) is selected in correspondence with a selected set in the L2 cache 402 and thereby a data bit is output from the selected sense amplifier through the output buffer 412 when an output enable signal RDgb is active.

Figure 11:
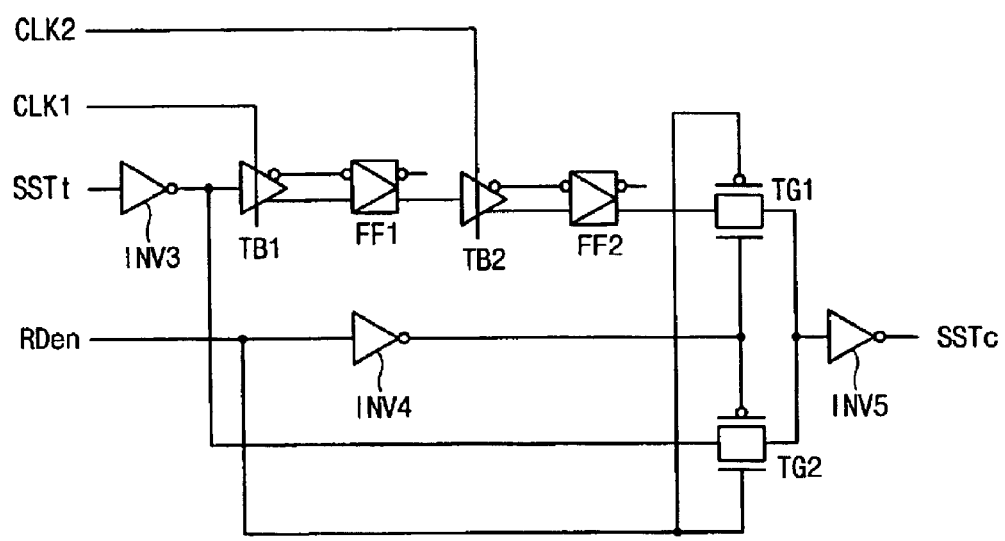
FIG. 11 is a circuit diagram of a set selection buffer according to the invention.

FIG. 11 shows an exemplary construction of a circuit for generating the set selection signal for the L2 cache, SSTc, including tri-state buffers TB1 and TB2, flip-flops FF1 and FF2, a transmission gate TG1 activated for writing data to the L2 cache, and a transmission gate TG2 activated for reading data from the L2 cache. The set selection signal SSTt generated from the tag comparator 408 is converted into the set selection signal SSTc through an inverter INV3, the tri-state buffer TB1, the flip-flop FF1, the tri-state buffer TB2, the flip-flop FF2, the transmission gate TG1, and an inverter INV5, serially connected, in order, during a read operation for the L2 cache, while through the inverter INV3, the transmission gate TG2, and the inverter INV5, in order, during a write operation for the L2 cache. Clock signals cLK1 and cLK2 are applied to the tri-state buffers TB1 and TB2, respectively, which are turned on and off synchronized to the clock signals. The read-enable signal RDen alternately controls on/off states of the transmission gates TG1 and TG2. In FIG. 11, a signal path for reading data from the L2 cache is controlled by the read-enable signal RDen while a signal path for writing data from the L2 cache is controlled by the clock signals cLK1 and cLK2.

Figure 12A:
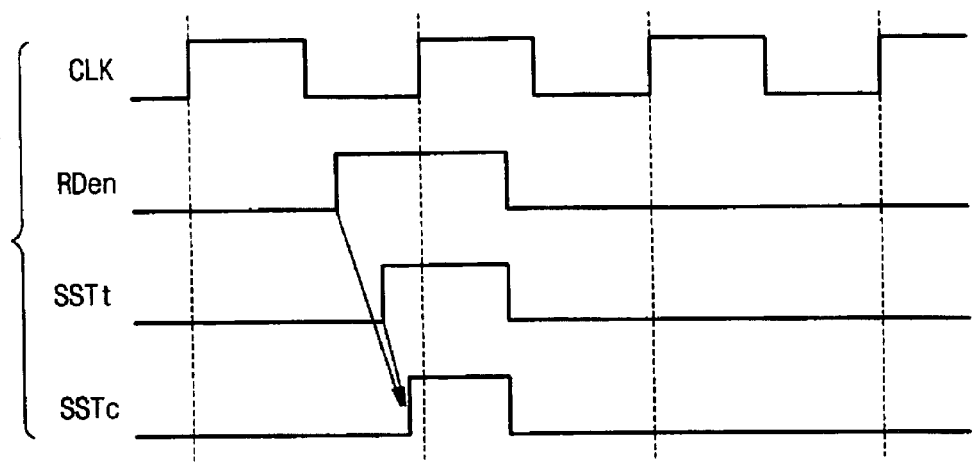
FIGS. 12A and 12B are timing diagrams illustrating transmissions of set selection signals during reading and writing operation modes.
Figure 12B:
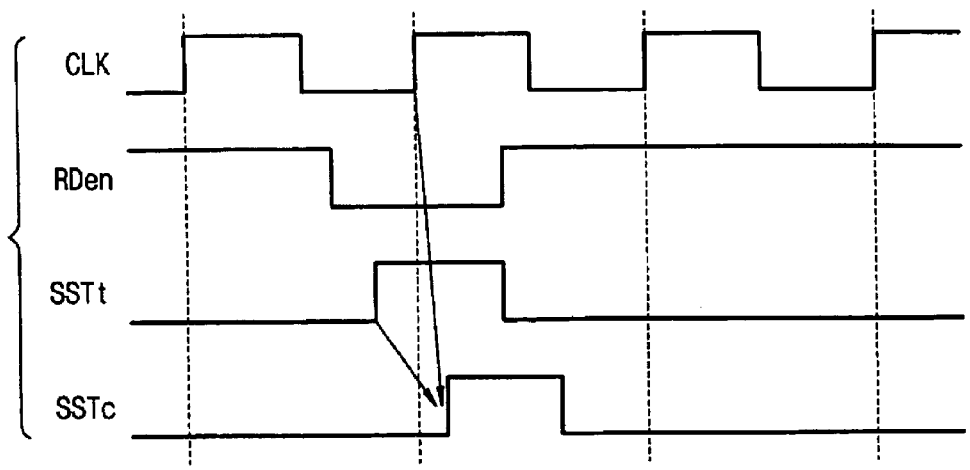

Referring to FIG. 12A, in reading data from the L2 cache in the state in which a read enable signal RDen is active with a high level, the set selection signal SSTt is applied to the L2 cache 402 as SSTc through the reading path shown in FIG. 11. The read-enable signal RDen, made from responding to a presence of a read command, is active before one clock cycle from an input of the set selection signal. In writing data into the L2 cache, as shown in FIG. 12B, the set selection signal SSTc arriving at the L2 cache is active in response to a rising edge of the clock signal.

With respect to the above description, compared with the conventional multiplexer-based multi-way set associative cache system, the present invention simplifies circuit structure for accessing data. The simplified structure of the present cache memory reduces power consumption by the rate of 1/N (N is the number of sets). Further, during a read operation, since the set selection signal is transferred to a L2 cache without awaiting an activation of a clock signal, it shortens propagation time of the set selection signal, resulting in enhancement of an overall access time in a multi-way set associative cache memory system.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of reading data stored in a set in a multi-way set associative cache memory, the method comprising the steps of:
   generating a set selection signal by comparing a stored address with an address of the data;
   reading the data from a set selected by the set selection signal through a sense amplifier; and
   providing a circuit for transferring the set selection signal to the sense amplifier for reading the data, the circuit comprising:
   a first tri-state buffer for receiving the set selection signal in response to a first clock signal;
   a first flip-flop for receiving an output of the first tri-state buffer;
   a second tri-state buffer for receiving an output of the first tri-state buffer in response to a second clock signal;
   a second flip-flop for receiving an output of the second tri-state buffer;
   a first transmission gate for transferring an output of the second flip-flop in response to a state of a read-enable signal; and
   a second transmission gate for transferring the set selection signal in response to another state of the read-enable signal.

2. A multi-way set associative cache memory associative with a data processor generating addresses for requested data, comprising:
   a tag memory for storing a tag;
   a data memory for storing data corresponding to the tag;
   a tag comparator for generating a set selection signal by comparing the tag with an address for the data; and
   a plurality of sense amplifiers for reading the data of the data memory, one of the sense amplifiers being active in response to the set selection signal; and
   a circuit for transferring the set selection signal to the sense amplifier for reading the data, the circuit comprising:
   a first tri-state buffer for receiving the set selection signal in response to a first clock signal;
   a first flip-flop for receiving an output of the first tri-state buffer;
   a second tri-state buffer for receiving an output of the first tri-state buffer in response to a second clock signal;
   a second flip-flop for receiving an output of the second tri-state buffer;
   a first transmission gate for transferring an output of the second flip-flop in response to a state of a read-enable signal; and
   a second transmission gate for transferring the set selection signal in response to another state of the read-enable signal.

3. The multi-way set associative cache memory of claim 2, wherein the data memory comprises a decoder for enabling a wordline in response to the address of the data.

4. The multi-way set associative cache memory of claim 2, wherein the sense amplifier is conductive in response to a sense-amp enable signal that is generated from a product of the read-enable signal and the set selection signal.

5. A multi-way set associative cache memory comprising:
   a tag memory for storing a tag;
   a data memory for storing data corresponding to the tag;
   a tag comparator for generating a set selection signal by comparing the tag with an address for the data;
   a plurality of sense amplifiers for reading the data of the data memory, one of the sense amplifiers being active in response to the set selection signal; and
   a circuit for transferring the set selection signal to the sense amplifier for reading the data, the circuit comprising:
   a first tri-state buffer for receiving the set selection signal in response to a first clock signal;
   a first flip-flop for receiving an output of the first tri-state buffer;
   a second tri-state buffer for receiving an output of the first tri-state buffer in response to a second clock signal;
   a second flip-flop for receiving an output of the second tri-state buffer;
   a first transmission gate for transferring an output of the second flip-flop in response to a state of a read-enable signal; and
   a second transmission gate for transferring the set selection signal in response to another state of the read-enable signal.

6. The multi-way set associative cache memory of claim 5, wherein the data memory comprises a decoder for enabling a wordline in response to the address of the data.

7. The multi-way set associative cache memory of claim 5, wherein the sense amplifier is conductive in response to a sense-amp enable signal that is generated from a product of a read-enable signal and the set selection signal.

8. The multi-way set associative cache memory of claim 5, wherein the set selection signal is driven through a transmission gate controlled by a read-enable signal.

9. The multi-way set associative cache of claim 5, wherein the set selection signal is converted to an enable signal in the circuit, the enable signal activating the sense amplifier.

* * * * *